(12) United States Patent
Doppel et al.

(10) Patent No.: US 8,050,006 B2
(45) Date of Patent: Nov. 1, 2011

(54) METHOD AND SYSTEM OF PROVIDING OVERLOAD AND SHORT-CIRCUIT PROTECTION FOR SWITCHED MODE POWER SUPPLY

(75) Inventors: Matthias Doppel, Weissenbrunn (DE); Gunther Grabner, Kronach (DE)

(73) Assignee: Lear Corporation GmbH, Ginsheim-Gustavsberg (DE)

( * ) Notice: Subject to any disclaimer, the term of this patent is extended or adjusted under 35 U.S.C. 154(b) by 302 days.

(21) Appl. No.: 12/338,261

(22) Filed: Dec. 18, 2008

(65) Prior Publication Data

US 2009/0168274 A1 Jul. 2, 2009

(30) Foreign Application Priority Data

Dec. 27, 2007 (DE) .......................... 10 2007 062 777

(51) Int. Cl.
*H02H 5/04* (2006.01)
*G01K 3/10* (2006.01)
(52) U.S. Cl. ........... 361/93.8; 361/103; 361/24; 361/25; 340/870.17; 374/163
(58) Field of Classification Search .................. 361/24, 361/103, 25, 93.8; 340/870.17; 374/163
See application file for complete search history.

(56) References Cited

U.S. PATENT DOCUMENTS

| | | | |
|---|---|---|---|
| 4,028,736 A | 6/1977 | Willson et al. | |
| 4,955,069 A * | 9/1990 | Ionescu | 388/811 |
| 5,063,516 A | 11/1991 | Jamoua et al. | |
| 5,600,550 A * | 2/1997 | Cook, II | 363/50 |
| 6,205,010 B1 | 3/2001 | Ohsaka et al. | |
| 6,320,275 B1 | 11/2001 | Okamoto et al. | |
| 6,876,043 B1 | 4/2005 | Sander | |
| 7,068,184 B2 * | 6/2006 | Yee et al. | 340/870.05 |
| 7,342,762 B2 * | 3/2008 | Harris, IV | 361/103 |
| 7,607,828 B2 * | 10/2009 | Beier et al. | 374/163 |
| 2007/0093359 A1 | 4/2007 | Kobayashi et al. | |

FOREIGN PATENT DOCUMENTS

DE 102005043882 A1 3/2007
EP 1245455 A2 10/2002

OTHER PUBLICATIONS

German Office Action for corresponding German Application No. 10 2007 062 777.9, mailed Sep. 16, 2008, 3 pages.

* cited by examiner

*Primary Examiner* — Rexford Barnie
*Assistant Examiner* — Zeev V Kitov
(74) *Attorney, Agent, or Firm* — Brooks Kushman P.C.

(57) ABSTRACT

A method of providing overload and short-circuit protection for a Switched Mode Power Supply (SMPS). The method may rely upon sensing a temperature change rate for a component of the SMPS and implementing a protection scheme when the temperature change rate exceeds a desired temperature change rate. The implementation scheme may include permanently or temporarily shutting-off the component.

20 Claims, 3 Drawing Sheets

METHOD AND SYSTEM OF PROVIDING OVERLOAD AND SHORT-CIRCUIT PROTECTION FOR SWITCHED MODE POWER SUPPLY

CROSS-REFERENCE TO RELATED APPLICATIONS

This application claims foreign priority benefits under 35 U.S.C. §119(a)-(d) to DE 10 2007 062 777.9, filed Dec. 27, 2007, which is hereby incorporated by reference in its entirety.

BACKGROUND OF THE INVENTION

1. Field of the Invention

The present invention relates to methods and systems of providing overload, short-circuit, and other protections for Switched Mode Power Supplies (SMPS) and other circuit configurations.

2. Background Art

Switched Mode Power Supplies (SMPS) are commonly used in any number of applications and environments to facilitate power distribution to one or more loads. A SMPS, for example, may be configured to regulate and/or otherwise distribute power from an input to an output, such as to power a load connected to the output. A component, such as but not limited to a transistor or other switch, may operate with other components included within the SMPS to regulate the SMPS power distribution. One control methodology relies upon switching the component on and off according to a desired duty cycle. This 'switching' operation, along with filters and other components of the SMPS, allows for the controlled regulation and distribution of power from an input to an output.

In some cases, an overload or short-circuit condition may cause the SMPS to operate above its desired capacity. Some SMPS may include a current sensor to monitor current consumption. A controller can monitor the current sensor and shut-off the SMPS if the sensed current exceeds a desired current threshold in order to protect the SMPS from damage. Some SMPS may include a temperature sensor to monitor SMPS temperature. The controller can monitor the temperature sensor and shut-off the SMPS if the sensed temperature exceeds a desired temperature threshold in order to protect the SMPS from over temperature conditions.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
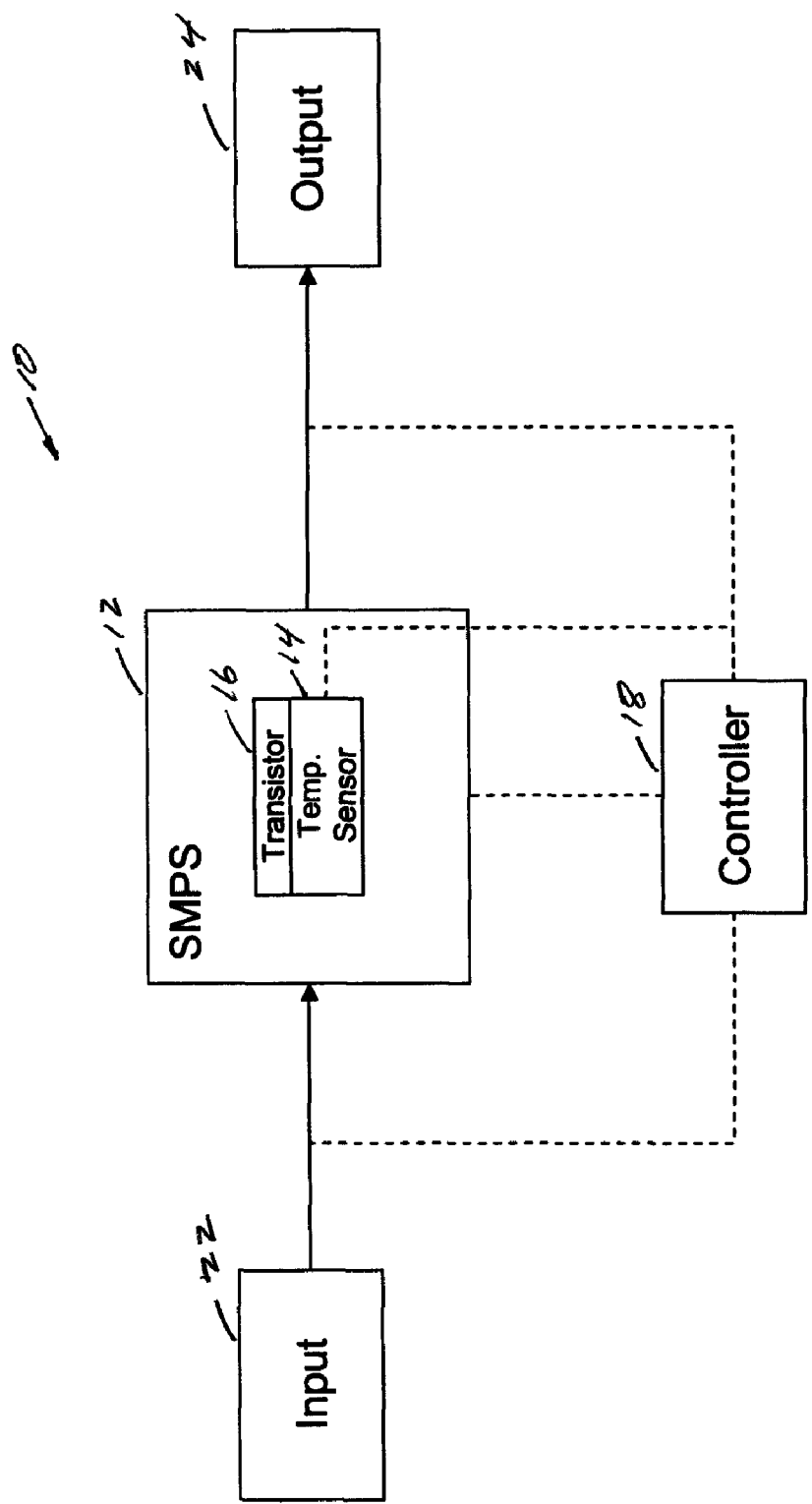
FIG. 1 illustrates a system of providing protection for a Switched Mode Power Supply (SMPS) in accordance with one non-limiting aspect of the present invention.

FIG. 1 illustrates a system 10 of providing protection for a Switched Mode Power Supply (SMPS) 12 in accordance with one non-limiting aspect of the present invention. The system 10 may be advantageous in protecting the SMPS 12 from overload, short-circuit, and other dangerous operating conditions. The system 10 may include a temperature sensor 14 for sensing a temperature of a component 16 included within the SMPS 12. A controller 18 may be included to control operations of the SMPS 12 as a function of the sensed temperatures, and if necessary, to implement a protection scheme as a function of the sensed temperatures.

The SMPS 12 is diagrammatically shown to regulate power from an input 22 to an output 24. A power source (not shown) and a load (not shown) may be connected to the input 22 and output 24. The SMPS 12 may include any number of components 16 and features to facilitate the 'switched' operations used to regulate the power distribution. The SMPS 12 may be configured to regulate an AC input to a desired AC or DC output and to regulate a DC input to a desired DC or AC output. The components 16 necessary to each of these different configurations are not shown as the present invention is not intended to be limited to any particular configuration or operation of the SMPS 12.

The controller 18 may be configured to monitor the input 22 and output 24 of the SMPS 12 and to control its operation as a function thereof. This may include controlling any number of operating conditions for any number of components 16 included within the SMPS 12. The controller 18 may also be configured to monitor the operating conditions and parameters of the power source and load(s) and to control the operation of the SMPS 12 as a function thereof. The controller 18 is shown to be a standalone feature but it may be integrated or otherwise included within SMPS 12. The controller 18 may be programmed or programmable to facilitate controlling and protecting the SMPS 12 as contemplated by the present invention.

A transistor 16 is shown to illustrate the component commonly included in SMPS 12 to facilitate the 'switched' operations used to regulate the power distribution. The present invention contemplates monitoring the temperature of the transistor 16 with the temperature sensor 14 and implementing the protection scheme as a function thereof. The temperature sensor 14 may be any temperature sensor suitable for monitoring the temperature of the transistor 16. Optionally, the temperature sensor 14 may be attached directly to the transistor 16, such as by soldering or otherwise directly or closely attaching the sensor 14 to soldering pads used to connect the transistor 16 to a PCB.

The temperature of a single transistor 16 is monitored and the operation thereof is controlled to provide protection against overload and short-circuit conditions for exemplary purposes and without intending to limit the scope and contemplation of the present invention. The present invention fully contemplates implementing SMPS 12 protection schemes based on the use, temperature monitoring, or control of multiple transistors 16 and/or any number of other components that may be included in the SMPS 12.

Figure 2:
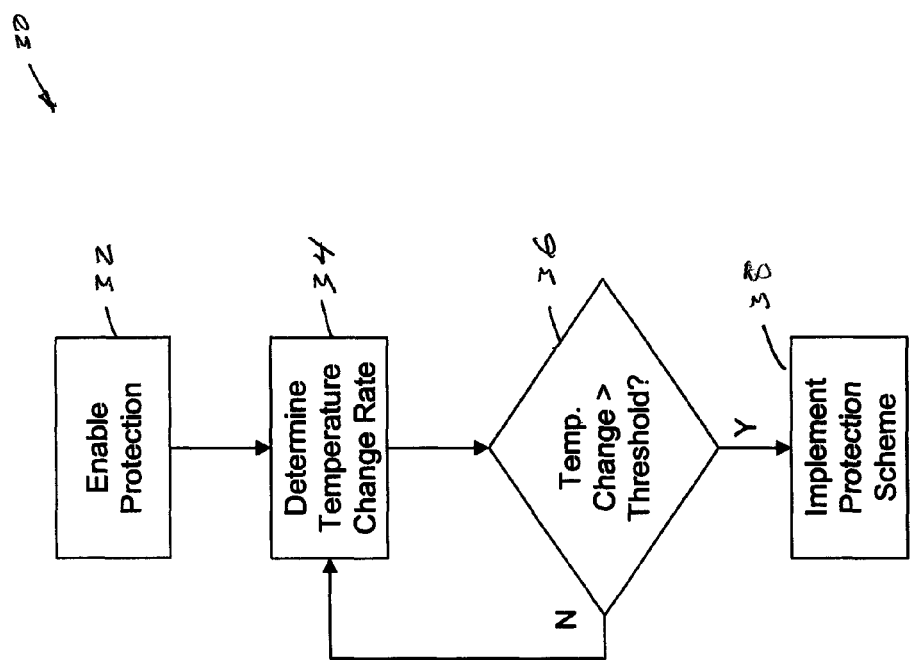
FIG. 2 illustrates a flowchart of a method of implementing a protection scheme in accordance with one non-limiting aspect of the present invention.

FIG. 2 illustrates a flowchart 30 of a method of implementing a protection scheme for a SMPS 12 or other circuit configuration in accordance with one non-limiting aspect of the present invention. The protection scheme maybe be used to protect the SMPS 12 from overload, short-circuit, or other dangerous operating conditions. As described below in more detail, the protection scheme may be a temperature based protection scheme. It may be implemented, controlled, and adjusted as a function of SMPS 12 temperature and/or one or more temperatures of one or more components included on the SMPS 12, such as but not limited to the transistor 16 illustrated in FIG. 1.

Block 32 relates to enabling a SMPS 12 controller to support implementation of a protection scheme. This may include loading the controller with a software application, such as if the protection scheme is used with after-market or SMPS 12 already in uses, and/or programming the controller at the time of manufacturing, such as if the controller is included as a part of an integrated circuit or other package having the SMPS 12.

Block 34 relates to determining a temperature change rate for a component included on the SMPS 12. The controller 18 may be configured to determine the temperature change rate from temperature values recorded by a temperature sensor 14 associated with the component. The temperature change rate may included determining whether the temperature is increasing and/or decreasing.

Block 36 relates to determining if the temperature change rate is greater than a desired temperature change rate. Depending on the load, the controller 18 may be programmed to determine acceptable temperature change rates. For example, it may be acceptable for the temperature of the component to rise at a particular rate for a particular load when the load is powered by the SMPS 12 for a particular period of time and at a different rate if the SMPS 12 is used to power a different load. Similarly, the desired temperature change rate may vary with desired operation of the load. The controller 18 may be configured to select the desired temperature change rate as a function of any of these and other operating conditions of the SMPS 12 and/or the load.

If the temperature change rate is less than the desired temperature rate of change, it may be assumed that the SMPS 12 and/or the load is operating within acceptable operating ranges. Block 34 may be returned to and the process may be repeated. If the temperature change rate is greater than the desired rate of change, it may be assumed that an overload, short-circuit, or other undesirable condition has occurred in the SMPS 12 and/or load. The controller may then implement a protection scheme in Block 38. The protection scheme may include adjusting control of the SMPS 12 and/or the load in such a manner as to protect the SMPS 12 and/or the load from damage.

The ability to assess temperature change rates and to implement a suitable protection scheme as a function thereof allows the present invention to implement protection schemes without relying on current sensors and/or temperature limit thresholds. One problem with other temperature based protection schemes is that they wait until the temperature reaches a predefined threshold before implementing a protection scheme instead of monitoring and tracking the temperature as it changes. These systems are unable to assess changes in the temperature of a component over time and to implement a protection strategy that is based on the temperature change rate.

Such single value, threshold based temperature based protection schemes can be particularly problematic if the temperature sensing lags behind the operation of the SMPS 12. In some case, by the time the over temperature conditions is registered, the temperature may have continued to rise before implementation of the protection scheme. This may result in damage to the SMPS 12 and/or the load. This can be especially problematic if the temperature is rising rapidly and quickly surpasses the desired temperature threshold. Since the present invention is able to monitor the temperature rate of change, it can quickly assess rapid changes of temperature before the temperatures surpass dangerous thresholds, thereby allowing the present invention to implement protection schemes at an earlier period of time.

Figure 3:
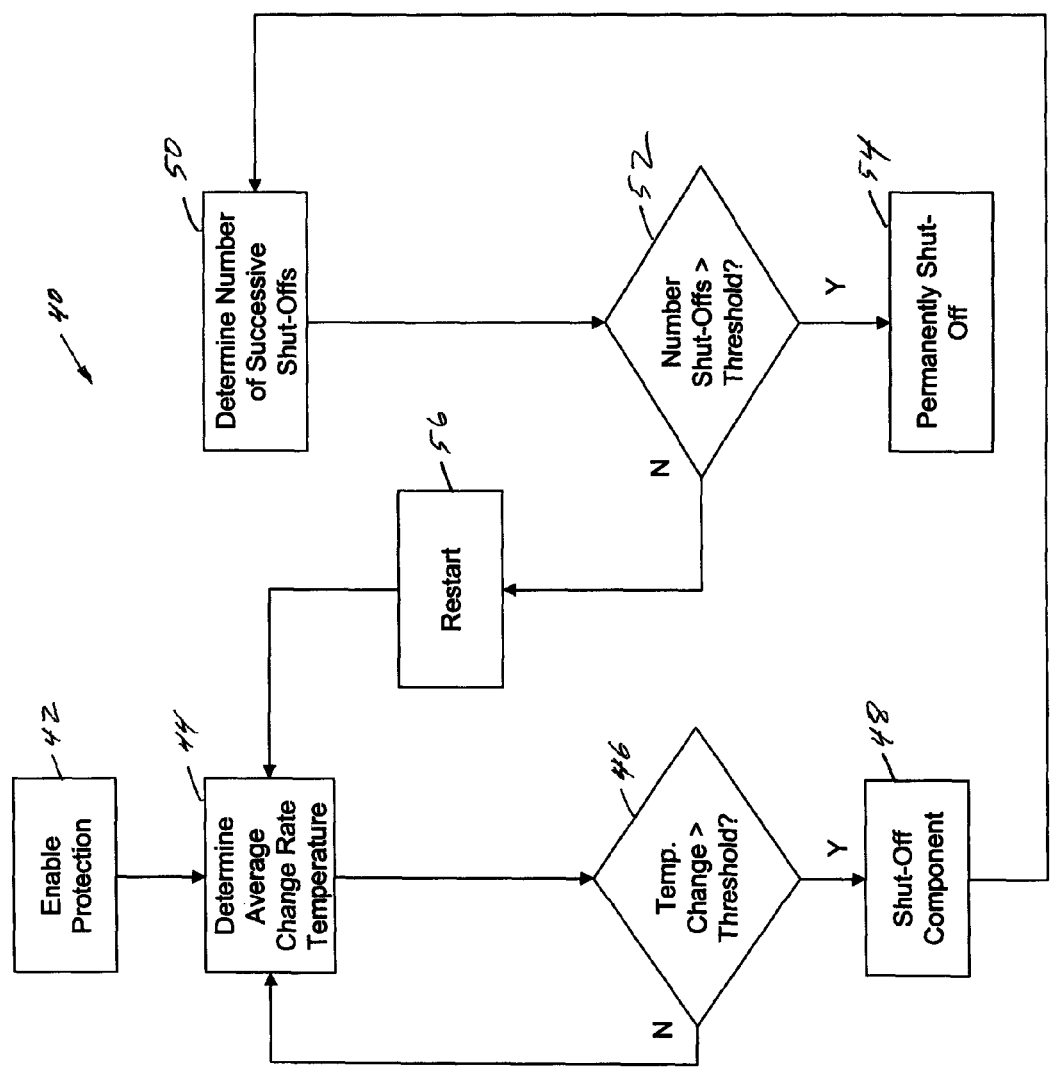
FIG. 3 illustrates a flowchart of a method of implementing an average temperature based protection scheme in accordance with one non-limiting aspect of the present invention

FIG. 3 illustrates a flowchart 40 of a method of implementing an average temperature based protection scheme for a SMPS 12 or other circuit configuration in accordance with one non-limiting aspect of the present invention. The protection scheme maybe be used to protect the SMPS 12 from overload, short-circuit, or other dangerous operating conditions. As described below in more detail, the protection scheme may be an average temperature based protection scheme. It may be implemented, controlled, and adjusted as a function of SMPS 12 temperature and/or one or more temperatures of one or more components included on the SMPS 12, such as but not limited to the transistor 16 illustrated in FIG. 1.

Block 42 relates to enabling a SMPS 12 controller to support implementation of a protection scheme. This may include loading the controller with a software application, such as if the protection scheme is used with after-market or SMPS 12 already in uses, and/or programming the controller at the time of manufacturing, such as if the controller is included as a part of an integrated circuit or other package having the SMPS 12.

Block 44 relates to determining a temperature change rate for an average temperature of a component included on the SMPS 12. The controller may be configured to determine the temperature change rate from average temperature values recorded by a temperature sensor associated with the component. The average temperature may be based on one more temperature readings occurring for a particular period of time. The average of these readings may be compared to an average temperature for a subsequent period of time in order to determine the temperature change rate.

The method described with respect to FIG. 2 requires two total temperature reading to determine the temperature change rate. The method of FIG. 3 requires at least two temperature readings to determine a first average temperature and at least another two temperature readings to determined a second average temperature. The at least first and second average temperatures can then be used to determined the average temperature change rate.

The average temperature change rate may be advantageous in limiting the influence of false temperature readings. Interferences in the system or other disruptions may cause the temperature sensor 14 to record an erroneously high temperature value. If the erroneous value is relied upon in determining the temperature change rate, it could lead to an unnecessary implementation of the protection scheme. The averaging of multiple temperature reading over different periods of time can help ameliorate this problem since it is unlikely that the same interference will persist for a prolonged period of time. When determining the average temperature change rate, any number of temperature readings may be required to determine the average temperature for any number of different periods of time.

Additional mathematically manipulations may be included to refine the average temperature values used to determined the average temperature change rate. This may include eliminating the highest and/or lowest temperature value from each period of time for which the average temperature is determined. For example, if 40 temperature readings are taken over successive 10 ms periods of time, the highest and/or lowest readings for each 10 ms period of time may be eliminated. The average temperature change rate would then correspond with the difference in temperature of the 38 temperature values for one 10 ms period of time relative to the 38 temperature values for a subsequent 10 ms period of time.

Block 46 relates to determining if the average temperature change rate is greater than a desired average temperature change rate. Depending on the load, the controller may be programmed to determine acceptable average temperature change rates. For example, it may be acceptable for the average temperature of the component 16 to rise a particular rate for a particular load when the load is powered by the SMPS 12 for a particular period of time and at a different rate if the SMPS 12 is used to power a different load. Similarly, the desired average temperature change rate may vary with desired operation of the load. The controller my be configured to select the desired average temperature change rate as a function of any of these and other operating conditions of the SMPS and/or the load.

If the average temperature change rate is less than the desired average temperature rate of change, it may be assumed that the SMPS 12 and/or the load is operating within acceptable operating ranges. Block 44 may be returned to and the process may be repeated. If the average temperature change rate is greater than the desired rate of change, it may be assumed that an overload, short-circuit, or other undesirable condition has occurred in the SMPS 12 and/or load. The controller may then implement a protection scheme.

FIG. 3 includes a shut-off protection scheme that begins with shutting-off the component 16 in Block 48. The shutting-off of the component 16 may require the controller to control the component 16 to an off or shutdown position, such as opening the transistor and/or completing shutting down the SMPS 12 and/or load, which in either scenario may prevent power from being distributed to the load. After a period of time, which may be selected by the controller based on the type of load, operation of the load, temperature rate of change, or other variable, the component 16 and/or the SMPS 12 may be restarted. The restarted component 16 may be then enable the SMPS 12 to begin powering the load.

Prior to enabling the restart, Block 50 may be reached and the number of shut-offs may be determined. The controller may track each time the component 16 and/or SMPS 12 is shut-off for comparison against a shut-off threshold. At Block 52, this number may be compared to a threshold. If the number is greater than the threshold, the component 16 and/or SMPS 12 may be permanently shut-off at Block 54 for repairs or other maintenance. If the number is less than the threshold, Block may be reached and the component 16 and/or SMPS 12 may be restarted. The process may be repeated. If the error persists, i.e., if the average temperature change rate remains above the desired average temperature change rate for sufficient number of test cycles, Block 54 is eventually reached to permanently shut-off the component 16 and/or SMPS 12. Optionally, the load may be shut-off or disable.

The threshold number of restarts may be advantageous in allowing continued operation in the event of temporary temperature disruptions and/or operation in the event that a temporary shut-down of the component 16 rectifies the issue. Optionally, the time between shut-off and restart may be controlled by the controller and increased or decreases as a function of the previous number of shut-offs, the average temperature rate of change, the type or operating condition of the load, and/or any number of other variables.

As supported above, one non-limiting aspect of the present invention relates to monitoring the rate at which a temperature of a component included on a SMPS 12 changes and to implementing a protection scheme if the temperature changes at an undesirable rate. The present invention may be advantageous over current control methods that monitor current inputted/outputted from the SMPS 12 and/or flowing through a transistor since those methods may be reactive and include additional current sensing components. The present invention may be advantageous over temperature threshold methods since those methods are unable to implement different protection schemes at different points of time as a function of the speed at which the temperature changes.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed is:

1. A method of providing overload and short-circuit protection for a Switched Mode Power Supply (SMPS), the method comprising:
   periodically sensing a temperature for a component included in the SMPS;
   determining a temperature change rate from the sensed temperatures, the temperature change rate indicating a rate of temperature change for the component;
   implementing a protection scheme when the temperature change rate is greater than a first desired temperature change rate
   wherein implementing the protection scheme includes:
   i. switching off the component;
   ii. restarting the component;
   iii. decreasing the first desired temperature rate change to a second desired temperature rate change;
   iv. thereafter, implementing the protection scheme when the temperature change rate is greater than the second desired temperature rate change.

2. The method of claim 1 wherein the component is a transistor.

3. The method of claim 1 further comprising implementing the protection scheme without sensing current.

4. The method of claim 1 wherein implementing the protection scheme includes permanently shutting-off the component when the temperature change rate after at least one restart is still greater than the second desired temperature change rate.

5. The method of claim 1 further comprising implementing the protection scheme when the temperature change rate indicates that a temperature of the component is increasing at a faster rate than the desired temperature change rate.

6. The method of claim 1 further comprising selecting the desired temperature change rate as a function of a load connected to the SMPS.

7. The method of claim 1 further comprising determining the temperature change rate from changes in average temperatures of the component occurring over at least two different periods of time.

8. The method of claim 7 further comprising eliminating the highest and lowest temperatures from each of the at least two different periods of time when determining the average temperatures for each period of time.

9. The method of claim 8 further comprising eliminating the lowest temperature from each of the at least two different periods of time when determining the average temperature for each period of time.

10. The method of claim 8 further comprising eliminating the highest temperature from each of the at least two different periods of time when determining the average temperature for each period of time.

11. A method of controlling a Switched Mode Power Supply (SMPS) comprising:
   determining an average temperature change rate for a component of the SMPS,
   the average temperature change rate being determined from at least two periods of time;
   implementing a protection scheme when the temperature change rate is greater than a desired temperature change rate;
   wherein implementing the protection scheme includes shutting-off the component;
   wherein implementing the protection scheme includes restarting the component and subsequently shutting-off the component when the average temperature change rate remains above the desired temperature change rate;
   decreasing the desired temperature change rate prior to restarting the component.

12. The method of claim 11 further comprising implementing the protection scheme without determining current.

13. The method of claim 11 wherein implementing the protection scheme includes shutting-off a load connected to the SMPS.

14. The method of claim 11 further comprising eliminating the highest temperature from each of the at least two different periods of time when determining the average temperature change rate.

15. A method of providing overload and short-circuit protection for a Switched Mode Power Supply (SMPS), the method comprising:
   periodically sensing a temperature for a transistor included in the SMPS;
   determining an average temperature change rate from multiple sensed temperatures sensed over at least two periods of time, the average temperature change rate indicating a rate of temperature change for the transistor;
   implementing a protection scheme when the average temperature change rate is greater than a desired temperature change rate;
   wherein implementing the protection scheme includes restarting the transistor and subsequently shutting-off the transistor when the average temperature change rate remains above the desired temperature change rate; and
   decreasing the desired temperature change rate each time the transistor is re-started following implementation of the protection scheme.

16. The method of claim 6 further comprising determining the second desired temperature rate change based on the load such that a load of a first type has a lower value set as the second desired temperature rate change than a load of a second type.

17. The method of claim 1 further comprising continually decreasing the second desired temperate rate change used to trigger implementation of the protection scheme with each re-start of the component until a specified number of component re-starts is determined.

18. The method of claim 17 further comprising reverting to use of the first desired temperature rate change to trigger implementation of the protection scheme in the event the temperature rate change remains below the second desired temperature rate change for a specified period of time.

19. The method of claim 11 further comprising decreasing the desired temperature rate change by a specified amount based on a load connected to the SMPS, the specified amount varying depending on the load such that a load of a first type has a lower value set as the second desired temperature rate change than a load of a second type.

20. The method of claim 15 further comprising decreasing the desired temperature rate change by a specified amount based on a load connected to the SMPS, the specified amount varying depending on the load such that a load of a first type has a lower value set as the second desired temperature rate change than a load of a second type.

* * * * *